United States Patent Office 3,164,441
Patented Jan. 5, 1965

3,164,441
PROCESS FOR THE PRODUCTION OF METAL BOROHYDRIDES
Dieter Goerrig, Lohmar, Germany
(% Farbenfabriken Bayer A.G., Leverkusen, Germany)
No Drawing. Filed July 20, 1959, Ser. No. 828,056
Claims priority, application Germany Aug. 9, 1958
4 Claims. (Cl. 23—14)

Metal borohydrides are obtained by reducing metal metaborates or other metal oxide-boron oxide systems with a metal hydride, or with a metal and hydrogen or other system capable of yielding a metal hydride under the reaction conditions, such as a carbide and hydrogen.

The present invention relates to a process for the production of borohydrides of alkali and alkaline earth metals by the reduction of boron compounds with hydrogen and silicon in presence of an alkali and/or alkaline earth metal compound. It is surprising that silicon can be so used since it is only a moderately strong reducing agent and hitherto it has only been possible to obtain metal borohydrides by employing extremely strong reducing agents.

The present invention can be carried out by reacting silicon in a hydrogen atmosphere with:

(1) A metal orthoborate, for example sodium orthoborate in which case the equation for the reaction is:

$$Na_3BO_3 + Si + H_2 \rightarrow NaBH_4 + Na_2SiO_3$$

(2) A metaborate-metal oxide mixture, for example a mixture of potassium metaborate and calcium oxide in which case the equation for the reaction is:

$$KBO_2 + CaO + Si + H_2 \rightarrow KBH_4 + CaSiO_3$$

(3) A metaborate-metal hydroxide mixture, for example a mixture of sodium metaborate and sodium hydroxide in accordance with the equation:

$$NaBO_2 + 4NaOH + 2Si \rightarrow NaBH_4 + 2Na_2SiO_3$$

(4) A boric acid anhydride-metal oxide mixture, for example a mixture of boron trioxide and barium oxide, the equation for this reaction being:

$$B_2O_3 + 3BaO + 2Si + 4H_2 \rightarrow Ba(BH_4)_2 + 2BaSiO_3$$

(5) A boric acid-metal oxide mixture, for example a mixture of metaboric acid and strontium oxide in accordance with the equation:

$$4HBO_2 + 7SrO + 5Si + 6H_2 \rightarrow 2Sr(BH_4)_2 + 5SrSiO_3$$

or (6) A boric acid-metal hydroxide mixture, for example a mixture of metaboric acid and lithium hydroxide in accordance with the equation:

$$HBO_2 + 7LiOH + 3Si \rightarrow LiBH_4 + 3Li_2SiO_3 + 2H_2$$

In the process of the present invention the silicon can be employed in the form of silicon per se, in the form of an alloy with one or more metals (e.g. in the form of ferrosilicon) or in the form of a compound of silicon. Equations for various reactions employing silicon in these three forms are given below:

(7) $3KBO_2 + 2CaH_2 + 2Si + 4H_2 \rightarrow 3KBH_4 + 2CaSiO_3$
(silicon in combination with a metal hydride)

(8) $B_2O_3 + 4Na + Si + 4H_2 \rightarrow 2NaBH_4 + Na_2SiO_3$ (silicon in combination with a metal and hydrogen)

(9) $3NaBO_2 + 2CaC_2 + 2Si + 14H_2$
$\rightarrow 3NaBH_4 + 2CaSiO_3 + 4CH_4$
(silicon in combination with a compound capable of being converted into a hydride under the reaction conditions)

(10) $3NaBO_2 + 2CaSi + 6H_2 \rightarrow 3NaPH_4 + 2CaSiO_3$ (silicon alloy)

(11) $9KBO_2 + 2Al_2Si_3 + 18H_2$
$\rightarrow 9KBH_4 + 2(Al_2O_3 \cdot 3SiO_2)$
(silicon compound)

The particular advantages of the process according to the present invention are (a) the cheapness of the starting material (reduction equivalent of silicon=7 g.), (b) by suitable choice of the starting materials the water-insolubility of the by-products of the reaction, such as $CaSiO_3$, enables pure borohydrides to be isolated in a particularly simple manner and (c) the high content of borohydride in the final product; the content of borohydride in the final product being 50% by weight in the case of the reaction illustrated by Equation 11 above, this content of borohydride being far in excess of that obtained with known processes.

The reaction according to the present invention is carried out in an atmosphere of hydrogen at superatmospheric pressure, for example at a pressure of from about 10 to about 300 atms. and at elevated temperature of from about 200 to about 800° C. The gas phase can be either stationary or flowing, the latter being necessary for example in the case of Reaction 9. The reaction may be carried out either with predominantly liquid components (in the case of many alkali metal compounds) or in the solid phase. In the former case, substances of low melting point may be added to the reaction components in order to lower the melting point of the batch and in the latter case substances of high melting point may be added.

Example 1

8 g. of 97% silicon having an average particle size of approximately 10μ are placed in an iron boat and covered with 34 g. of $Na_3BO_3$. The iron boat containing the reaction mixture is placed in an autoclave in a horizontal position and the mixture is heated for 3 hours at 600° C., a pressure of hydrogen of from 150 to 160 atm. gauge being maintained in the autoclave throughout the reaction. The iron boat is then allowed to cool and the contents thereof are emptied out. 40.3 g. of a white mass are obtained which, on analysis, was found to contain 22.3%=9.0 g. of $NaBH_4$. This corresponds to a yield of 94%, based on $Na_3BO_3$, and 92%, based on Si.

Example 2

82 grams of $KBO_2$ and 28 grams of silicon (1 mol of each) are ground together in a porcelain ball mill for 8 hours. For 120 hours 100 grams of the powder mixture are kept under a hydrogen pressure of 150 atm. gauge and at 650° C. in an autoclave of 450 ccm. The reaction product contains 26.4 percent by weight of $KBH_4$ according to a yield of about 55 percent of the theory.

Example 3

25 kilograms of sodium orthoborate with a $Na_3BO_3$-content of 99.4 percent by weight (residue mainly $H_2O$ and $CO_2$) and 5.6 kilograms of silicon with a silicon content of 98.9 percent (residue mainly Fe)—in form of a coarse-grained powder—are given into a ball mill with steel ball filling with a capacity of 30 litres and ground for 20 minutes. After an addition of 0.4 litre of a lubricating oil the powder is ground for further 10 minutes. The dusty, very fine powder, obtained in this manner, is compressed on an egg coal roll press to porous molded articles of about 20 grams per weight. The eggs are heated in a hydrogen atmosphere under a pressure of 25 atm. gauge to 720° C. and left at this temperature for 6 hours. The reaction product consists of 22.4 to 22.9 percent by weight of $NaBH_4$ (i.e. under consideration of the starting materials the yield is nearly quantitative), contains scarcely 0.1 percent by weight NaH and is nearly completely soluble in water.

I claim:
1. A process for the preparation of a metal borohydride having the formula $M(BH_4)_n$ wherein M is a member selected from the group consisting of alkali and alkaline earth metals and $n$ is an integer number selected from the group consisting of 1 and 2, corresponding to the valence of M, which comprises reacting a member selected from the group consisting of alkali metal and alkaline earth metal metaborates, orthoborates and tetraborates; mixtures of boric acid anhydride with a member selected from the group consisting of alkali metals, alkali metal oxides and alkaline earth metal oxides; mixtures of boric acid with a member selected from the group consisting of alkali metals, alkali metal oxides, alkaline earth metal oxides, alkali metal hydroxides and alkaline earth metal hydroxides; and mixtures of a member selected from the group consisting of alkali metal and alkaline earth metal metaborates, orthoborates and tetraborates with a member selected from the group consisting of alkali metal oxides, alkaline earth metal oxides, alkali metal hydroxides, alkaline earth metal hydroxides, alkali metal hydrides and alkaline earth metal hydrides; with a member selected from the group consisting of silicon, silicon alloys and binary compounds of silicon and a metal, said group member having reducing activity and hydrogen, at a pressure of from about 10 to 300 atmospheres and at a temperature of from about 200 to about 800° C. to obtain the borohydride.

2. A process according to claim 1, which comprises reacting sodium orthoborate with hydrogen and silicon at a temperature of about 600° C. and a hydrogen pressure of from about 150 to 160 atmospheres to obtain sodium borohydride.

3. A process according to claim 1, which comprises reacting sodium orthoborate with hydrogen and silicon at a temperature of about 720° C. and a hydrogen pressure of about 24 atmospheres to obtain sodium borohydride.

4. A process according to claim 1, which comprises reacting potassium metaborate with hydrogen and silicon at a temperature of about 650° C. and a hydrogen pressure of 150 atmospheres to obtain the potassium borohydride.

References Cited in the file of this patent

UNITED STATES PATENTS 2,744,810    Jackson _____ May 8, 1956

FOREIGN PATENTS 548,676    Canada _____ Nov. 12, 1957
583,848    Canada _____ Sept. 22, 1959
563,447    Belgium _____ Jan. 15, 1958
1,053,476    Germany _____ Mar. 26, 1959

OTHER REFERENCES

Mellor: "Comprehensive Treatise on Inorganic and Theoretical Chemistry," 1925, vol. 6, page 176.

Van Wazer: "Phosphorus and its Compounds," 1958, vol 1, pp. 146–147.

Hurd: "Journal of the American Chemical Society," vol. 71, pp. 20–22 (1949).

Taylor: "Inorganic and Theoretical Chemistry," 9th edition, 1952, pp. 148–149.